(12) United States Patent
Lin et al.

(10) Patent No.: US 11,322,768 B2
(45) Date of Patent: May 3, 2022

(54) CATHODE FOR SOLID OXIDE FUEL CELL

(71) Applicant: PHILLIPS 66 COMPANY, Houston, TX (US)

(72) Inventors: Ye Lin, Bartlesville, OK (US); Ying Liu, Bartlesville, OK (US); Mingfei Liu, Bartlesville, OK (US)

(73) Assignee: Phillips 66 Company, Houston, TX (US)

(*) Notice: Subject to any disclaimer, the term of this patent is extended or adjusted under 35 U.S.C. 154(b) by 0 days.

(21) Appl. No.: 16/710,698

(22) Filed: Dec. 11, 2019

(65) Prior Publication Data

US 2020/0194815 A1 Jun. 18, 2020

Related U.S. Application Data

(60) Provisional application No. 62/778,753, filed on Dec. 12, 2018.

(51) Int. Cl.
*H01M 8/126* (2016.01)
(52) U.S. Cl.
CPC ................... *H01M 8/126* (2013.01)

(58) Field of Classification Search
CPC ..................................................... H01M 8/126
See application file for complete search history.

(56) References Cited

U.S. PATENT DOCUMENTS

| 3,533,849 | A | 10/1970 | Mitoff |
| 2002/0187389 | A1* | 12/2002 | Wallin ................ H01M 4/9033 429/489 |
| 2005/0089749 | A1* | 4/2005 | Komada ............. H01M 4/9016 429/482 |
| 2008/0299434 | A1* | 12/2008 | Katagiri ................ B32B 38/145 429/465 |
| 2012/0270139 | A1 | 10/2012 | Park et al. |
| 2015/0099209 | A1 | 4/2015 | Liu et al. |

OTHER PUBLICATIONS

PCT Notification of Transmittal of the International Search Report and the Written Opinion of the International Searching Authority, or the Declaration; International Application No. PCT/US2019/065714; International Filing Date: Dec. 11, 2019; 11 pages.

* cited by examiner

*Primary Examiner* — Brian R Ohara
(74) *Attorney, Agent, or Firm* — Phillips 66 Company

(57) ABSTRACT

A solid oxide fuel cell comprising an anode, an electrolyte, and a cathode comprising $Pr_xCo_yO_3$, wherein the ratio of x and y are 1:1.

1 Claim, 3 Drawing Sheets

CATHODE FOR SOLID OXIDE FUEL CELL

CROSS-REFERENCE TO RELATED APPLICATIONS

This application is a non-provisional application which claims the benefit of and priority to U.S. Provisional Application Ser. No. 62/778,753 filed Dec. 12, 2018, titled "Cathode for Solid Oxide Fuel Cell," which is hereby incorporated by reference in its entirety.

STATEMENT REGARDING FEDERALLY SPONSORED RESEARCH OR DEVELOPMENT

None.

FIELD OF THE INVENTION

This invention relates to a novel cathode for a solid oxide fuel cell.

BACKGROUND OF THE INVENTION

Reducing operating temperature could effectively improve lifetime and lower the material and operating costs of solid oxide fuel cell (SOFC) systems. To achieve this goal, new materials with better electrochemical properties and structures with miniature features can be used. It is generally agreed that SOFC performance is dominated by the oxygen reduction and incorporation processes in the cathodes, especially at low operating temperatures (i.e., <650° C.). At low temperatures, cathode performance is affected not only by its inherent characteristics such as conductivity but also by its surface chemistry and morphology.

Most state-of-the-art cathode materials contain significant amounts of alkaline elements (Ba, Ca, and Sr), which have the tendency to react with the $CO_2$ and moisture present in ambient air. In addition, chromium in the metal interconnects could easily vaporize and migrate to the cathode surface and form insulating phases with Sr containing cathode materials during the SOFC operation, forming insulators. There has been tremendous effort expended in developing new cathodes that are able to function better at low temperatures in terms of both electrochemical performance and stability. Generally, there are two approaches to improving cathode performance. The first is to develop totally new cathode materials with higher bulk catalytic properties. However, it is extremely difficult, if not impossible, to develop totally new material systems with much higher performance. The second is to modify the surface conditions of the existing electrode materials by applying a thin layer of new materials with extremely high electrochemical activity or surface area to backbones made of conventional cathode materials. Modifying the surface conditions dramatically increases the number of active oxygen reduction reaction sites (triple phase boundaries) and significantly reduces the electrode polarization resistances, while preserving the high electrochemical properties of the backbone materials. In addition, the stability of the backbone cathode can be improved because the highly reactive, mobile alkaline elements in the backbone cathode will be isolated by the functional surface coating.

There exists a need for a novel cathode material.

BRIEF SUMMARY OF THE DISCLOSURE

A solid oxide fuel cell comprising an anode, an electrolyte, and a cathode comprising $Pr_xCo_yO_3$, wherein the ratio of x and y are 1:1.

A solid oxide fuel cell comprising an anode, an electrolyte, and a multilayer cathode. In this embodiment at least one cathode layer comprises $Pr_xCo_yO_3$ and the ratio of x and y are 1:1.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The present embodiment describes a solid oxide fuel cell comprising an anode, an electrolyte, and a cathode comprising $Pr_xCo_yO_3$, wherein the ratio of x and y are 1:1.

In another embodiment, a solid oxide fuel cell comprising an anode, an electrolyte, and a composite cathode comprising $Pr_xCo_yO_3$, and $Ce_{0.9}Gd_{0.1}O_2$ (GDC) wherein the ratio of x and y are 1:1.

In another embodiment, a solid oxide fuel cell comprising an anode, an electrolyte, and a multilayer cathode wherein at least one cathode layer comprises $Pr_xCo_yO_3$, wherein the ratio of x and y are 1:1.

Figure 1:
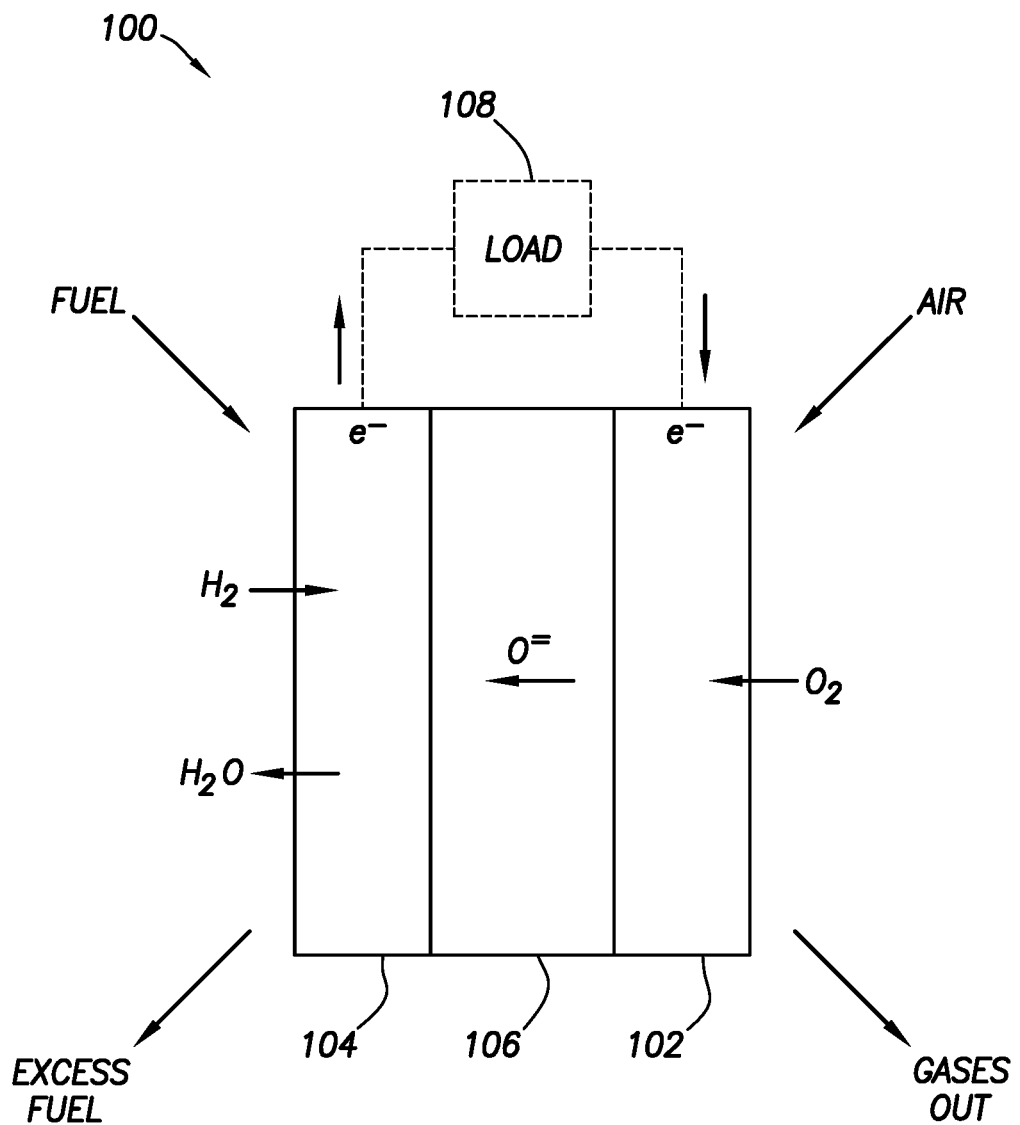
FIG. 1 depicts a schematic of a fuel cell.

FIG. 1 depicts a schematic block diagram of a conventional fuel cell 100. The illustrated fuel cell 100 includes a cathode 102, an anode 104, and an electrolyte 106. In general, the cathode 102 extracts oxygen ($O_2$) from an input oxidant (e.g., ambient air) and reduces the oxygen into oxygen ions. The remaining gases are exhausted from the fuel cell 100. The electrolyte 106 diffuses the oxygen ions from the cathode 102 to the anode 104. The anode 104 uses the oxygen ions to oxidize hydrogen ($H_2$) from the input fuel (i.e., combine the hydrogen and the oxygen ions). The oxidation of the hydrogen forms water ($H_2O$) and free electrons ($e^-$). The water exits the anode 104 with any excess fuel. The free electrons can travel through an external circuit (shown dashed with a load 108) between the anode 104 and the cathode 102. When combined with other fuel cells 100 within a fuel cell stack, the power generation capabilities of all of the solid oxide fuel cells 100 can be combined to output more power.

In one embodiment, additional cathode layers for the SOFC can be any conventionally known cathode capable of converting oxygen ($O_2$) from an input oxidant (e.g., ambient air) and reduces the oxygen into oxygen ions. Non-limiting examples of the cathode material can be perovskite materials, lanthanum manganite materials, lanthanum cobaltite and ferrite materials, ferro-cobaltite materials, and nickelate materials. Other more specific examples of cathode materials can be $Pr_{0.5}Sr_{0.5}FeO_{3-\delta}$; $Sr_{0.9}Ce_{0.1}Fe_{0.8}Ni_{0.2}O_{3-\delta}$; $Sr_{0.8}Ce_{0.1}Fe_{0.7}Co_{0.3}O_{3-\delta}$; $LaNi_{0.6}Fe_{0.4}O_{3-\delta}$; $Pr_{0.8}Sr_{0.2}Co_{0.2}Fe_{0.8}O_{3-\delta}$; $Pr_{0.7}Sr_{0.3}Co_{0.2}Mn_{0.8}O_{3-67}$; $Pr_{0.8}Sr_{0.2}FeO_{3-67}$; $Pr_{0.6}Sr_{0.4}Co_{0.8}Fe_{0.2}O_{3-\delta}$; $Pr_{0.4}Sr_{0.6}Co_{0.8}Fe_{0.2}O_{3-\delta}$;

$Pr_{0.7}Sr_{0.3}Co_{0.9}Cu_{0.1}O_{3-\delta}$; $Ba_{0.5}Sr_{0.5}Co_{0.8}Fe_{0.2}O_{3-\delta}$; $Sm_{0.5}Sr_{0.5}CoO_{3-\delta}$; and $LaNi_{0.6}Fe_{0.4}O_{3-\delta}$. In one embodiment the cathode material is a mixture of gadolinium-doped ceria $(Ce_{0.9}Gd_{0.1}O_2)$ and lanthanum strontium cobalt ferrite $(La_{0.6}Sr_{0.4}Co_{0.2}Fe_{0.8}O_3)$ or a mixture of gadolinium-doped ceria (GDC) $(Ce_{0.9}Gd_{0.1}O_2)$ and samarium strontium cobaltite (SSC), $Sm_{0.5}Sr_{0.5}CoO_3$.

In one embodiment, the electrolyte material chosen for the SOFC can be any conventionally known electrolyte capable of diffusing the oxygen ions from the cathode to the anode. Non-limiting examples of the electrolyte materials that can be used include yttria-stabilized zirconia, scandium-stabilized zirconia, gadolinium doped ceria, or lanthanum strontium magnesium gallate. Other more specific examples of electrolyte materials can be $(ZrO_2)_{0.92}(Y_2O_3)_{0.08}$, $Ce_{0.9}Gd_{0.1}O_2$, $Ce_{0.9}Sm_{0.2}O_2$, $La_{0.8}Sr_{0.2}Ga_{0.8}Mg_{0.2}O_3$, $BaZr_{0.1}Ce_{0.7}Y_{0.1}Yb_{0.1}O_3$.

In one embodiment, the anode material chosen for the SOFC can be any conventionally known anode material capable of using the oxygen ions to oxidize hydrogen $(H_2)$ from the input fuel (i.e., combine the hydrogen and the oxygen ions). Non-limiting examples of anode material include mixtures of NiO, yttria-stabilized zirconia, gadolinium-doped ceria, CuO, CoO and FeO. Other more specific examples of anode materials can be a mixture of 50 wt. % NiO and 50 wt. % yttria-stabilized zirconia or a mixture of 50 wt. % NiO and 50 wt. % gadolinium-doped ceria.

$PrCoO_3$ Cathode

The composition of the precursors for synthesizing $PrCoO_3$ (Pr:Co 1:1) is shown below as table 1.

TABLE 1

| | |
|---|---|
| Solution concentration (mol/L) | 0.25 |
| Solution volume (mL) | 50 |
| $Pr(NO_3)_3 \cdot 6H_2O$ (g) | 5.438 |
| $Co(NO_3)_2 \cdot 6H_2O$ (g) | 3.638 |
| Citric acid (g) | 1.609 |
| IPA (g) | 2.160 |

$PrCoO_3$ powder was prepared by a sol-gel method. The appropriate amount of precursors including $Pr(NO_3)_3.6H_2O$ and $Co(NO_3)_3.6H_2O$ were dissolved in deionized water. Citric acid was added as a chelating agent. The molar ratio of metal ions/citric acid was kept at 1:2. The precursor solution was placed on a hot plate at 120° C. until it became a viscous gel. The gel was transferred to an oven and dried at 160° C. overnight and the resulting brownish powder was further calcined in a furnace at 800° C. for 5 hours, yielding $PrCoO_3$ raw powder with homogeneously dispersed cations.

Test Data of Running a Cathode of $PrCoO_3$ v. Other Cathodes

Figure 2:
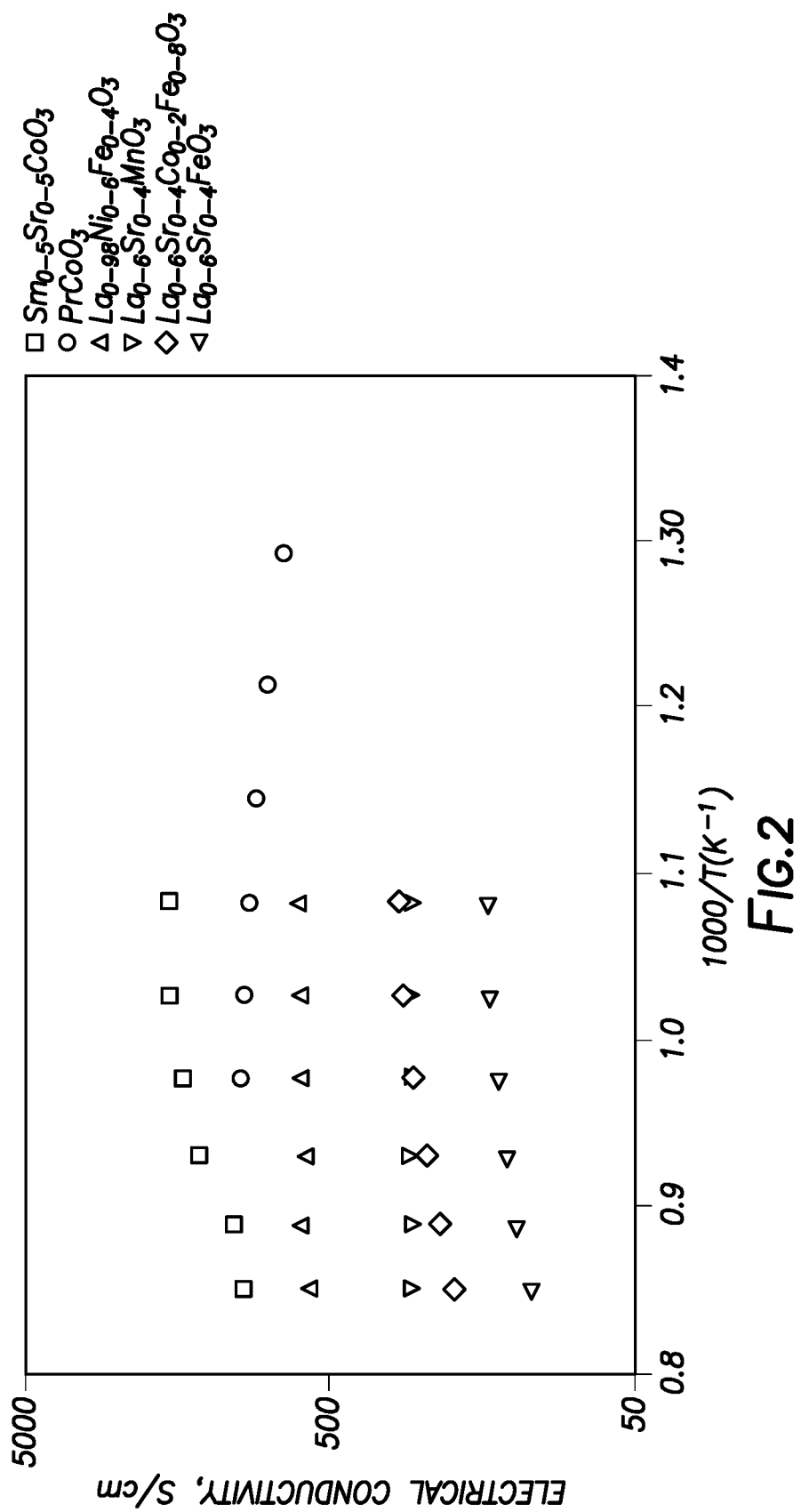
FIG. 2 depicts electrical conductivity measurements of cathodes.
Figure 3:
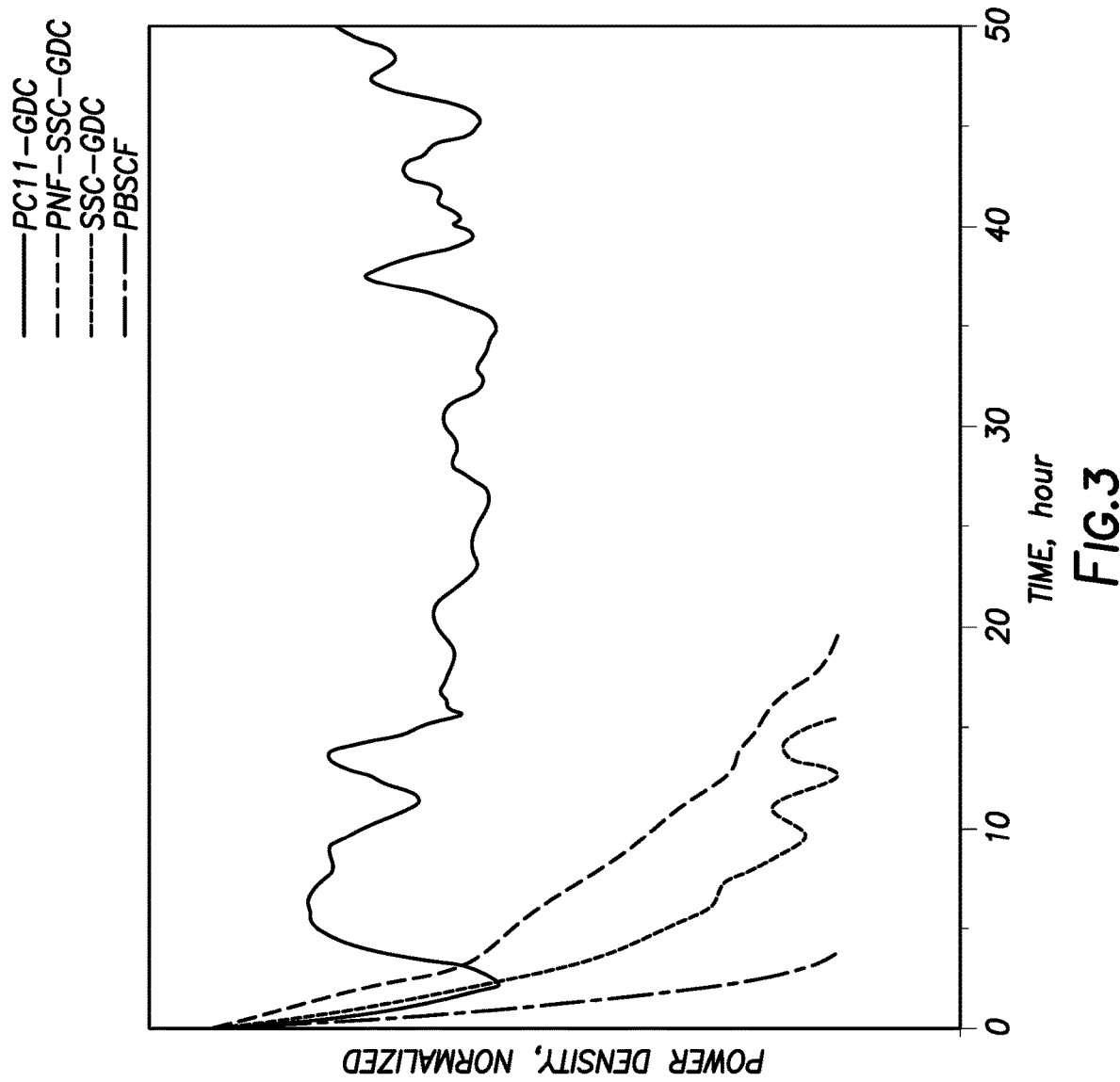
FIG. 3 depicts stability tests of various cathodes.

FIG. 2 depicts the electrical conductivity data of $PrCoO_3$ together with those of several common cathode materials. $PrCoO_3$ had higher conductivities than most state-of-the-art cathodes including $La_{0.65}Sr_{0.3}MnO_3$, $La_{0.6}Sr_{0.4}Co_{0.2}Fe_{0.8}O_3$, $La_{0.7}Sr_{0.3}FeO_3$, and $La_{0.98}Ni_{0.6}Fe_{0.4}O_3$. Although the conductivities of $PrCoO_3$ were slightly lower than those of $Sm_{0.5}Sr_{0.5}CoO_3$, which was well known to readily react with the trace amount $CO_2$ and $H_2O$ in air.

In another embodiment, a composite cathode ink (PC-GDC) was prepared by mixing 60 wt. % $PrCoO_3$ and 40 wt. % GDC with appropriate amount of ink vehicle (from FuelCellMatrials.com) on a high energy mall mill for 2 hours. The resulting viscous ink was applied onto the fuel cells by either brush painting or screen printing. The cathode was then dried in an oven at 90° C. for one hour and was further sintered at a temperature between 800-1000° C. In one embodiment the thickness of the composite cathode is around 15 μm.

The effect of cathode sintering temperature is shown in Table 2. All of the cells had a cathode thickness of 12 μm and LSCF was used as the cathode contact paste. The 900° C. sintered PC-GDC cathode generated the highest power densities at 0.8V were 230, 323, and 404 mW/cm², 650, 700, and 750° C., respectively.

TABLE 2

| Material compositions | Cathode sintering temperature (° C.) | Power Density at 0.8 V, 650° C. (mW cm⁻²) | Power Density at 0.8 V, 700° C. (mW cm⁻²) | Power Density at 0.8 V, 750° C. (mW cm⁻²) |
|---|---|---|---|---|
| PC-GDC | 850 | 153 | 233 | 316 |
| PC-GDC | 900 | 230 | 323 | 404 |
| PC-GDC | 950 | 213 | 307 | 392 |
| PC-GDC | 1000 | 157 | 247 | 306 |

When SSC was used as the cathode contact layer, the power densities at 0.8V of the cell with a 900° C. sintered cathode produced 281, 391, and 518 mW/cm2, 650, 700, and 750° C. respectively. Further reducing cathode thickness to 8 μm yielded even higher powder densities of 274, 415, and 562 mW/cm2 at 0.8V, 650, 700, and 750° C., respectively.

In the accelerated stability testing with 1.6% $CO_2$ in air, the PC-GDC cathode showed no degradation in 50 h of testing, while all the other cathode materials, including PBSCF, SSC-GDC, and PNF-coated SSC-GDC, suffered from rapid performance degradation. The PNF-coated SSC-GDC did show better stability than the other two advanced cathode materials, PBSCF and SSC-GDC. The initial performance of the new PC-GDC cathode was at the same level as that of the SSC-GDC cathode, but with much better stability in a $CO_2$ environment. Optimizing the PC-to-GDC ratio, cathode thickness, and microstructure could further improve the cathode performance.

The XRD patterns of the mixtures of $Cr_2O_3$ and different and cathode materials including PC, SSC, LSCF, LSM and LSC were also tested. These test results indicated that $SrCrO_4$ peaks could be clearly observed in SSC, LSC and LSCF mixtures with $Cr_2O_3$ oxide, after aging at 700° C. for 50 hours. However, no $SrCrO_4$ peaks were observed in PC and LSM mixtures. Thus, PC didn't react with $Cr_2O_3$.

Table 3 compares the power densities of SOFCs with PC-GDC and LSM-YSZ as cathode materials. The PC-GDC showed much higher performance than LSM-YSZ cathode.

TABLE 3

| Material | Power Density at 0.8 V, 650° C. (mW cm⁻²) | Power Density at 0.8 V, 700° C. (mW cm⁻²) | Power Density at 0.8 V, 750° C. (mW cm⁻²) |
|---|---|---|---|
| PC-GDC | 274 | 415 | 562 |
| LSM-YSZ | 133 | 209 | 311 |

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A solid oxide fuel cell comprising: an anode;
an electrolyte; and
a multilayer cathode, wherein at least one composite cathode layer comprising $Pr_xCo_yO_3$ and $Ce_{0.9}Gd_{0.1}O_2$ the ratio of x and y are 1:1.

* * * * *